(12) United States Patent
Mosaner

(10) Patent No.: US 7,568,435 B2
(45) Date of Patent: Aug. 4, 2009

(54) BELLOWS OF A CONNECTION BETWEEN TWO HINGE-LINKED VEHICLES

(75) Inventor: Knud Mosaner, Kassel (DE)

(73) Assignee: Hübner GmbH, Kassel (DE)

( * ) Notice: Subject to any disclaimer, the term of this patent is extended or adjusted under 35 U.S.C. 154(b) by 77 days.

(21) Appl. No.: 11/643,351

(22) Filed: Dec. 21, 2006

(65) Prior Publication Data

US 2007/0175355 A1 Aug. 2, 2007

(30) Foreign Application Priority Data

Jan. 19, 2006 (DE) ........................ 10 2006 002 655

(51) Int. Cl.
*B60D 5/00* (2006.01)
(52) U.S. Cl. .............................. 105/20; 105/18; 105/8.1
(58) Field of Classification Search .................. 105/8.1, 105/9, 10, 15, 18, 19, 20
See application file for complete search history.

(56) References Cited

U.S. PATENT DOCUMENTS

| | | | | |
|---|---|---|---|---|
| 2,004,231 A | * | 6/1935 | Wasson | 24/457 |
| 4,690,421 A | * | 9/1987 | Schmidt et al. | 280/403 |
| 5,060,578 A | * | 10/1991 | Carimentrand | 105/18 |
| 5,259,323 A | * | 11/1993 | Koch et al. | 105/20 |
| 5,456,186 A | * | 10/1995 | Hubner | 105/18 |
| 5,471,934 A | * | 12/1995 | Koch | 105/18 |
| 5,487,555 A | * | 1/1996 | Koch et al. | 280/403 |
| 5,546,866 A | * | 8/1996 | Koch | 105/8.1 |
| 6,076,470 A | * | 6/2000 | Koch | 105/8.1 |
| 6,926,344 B2 | * | 8/2005 | Koch et al. | 296/178 |
| 7,392,748 B2 | * | 7/2008 | De Antonio et al. | 105/8.1 |
| 2004/0036319 A1 | * | 2/2004 | Koch et al. | 296/178 |
| 2007/0007795 A1 | * | 1/2007 | Koch et al. | 296/178 |
| 2007/0175355 A1 | * | 8/2007 | Mosaner | 105/18 |

FOREIGN PATENT DOCUMENTS

| | | |
|---|---|---|
| DE | 1 257 822 | 1/1968 |
| DE | G 91 13 821.3 | 2/1992 |
| DE | 43 13 330 C2 | 9/1994 |
| DE | 200 20 061 U1 | 3/2001 |
| DE | 102 38 673 C1 | 12/2003 |
| EP | 0 631 890 B1 | 4/1998 |
| GB | 2 413 833 A | 11/2005 |

* cited by examiner

*Primary Examiner*—S. Joseph Morano
*Assistant Examiner*—Jason C Smith
(74) *Attorney, Agent, or Firm*—Thomas R. Vigil

(57) ABSTRACT

The subject matter of the invention is a bellows (1) of a connection between two hinge-linked vehicles (5, 6), said bellows (1), which comprises a bellows bottom (4), a bellows roof (2) and bellows side walls (3), forming a tunnel-like tube, said bellows bottom (4) being a removable constituent part of said bellows (1), said bellows (1) having a plurality of frames (10) disposed one behind the other in the longitudinal direction of said bellows (1), said bellows bottom (4) having a plurality of ledges (20) disposed one behind the other, there being provided, to connect a respective one of a frame (10) with a ledge (20), a spring cramp (30) taking hold of the frame and the ledge, said spring cramp (30) having at least one shoulder (33) for matingly connecting frame (10) and ledge (20).

8 Claims, 6 Drawing Sheets

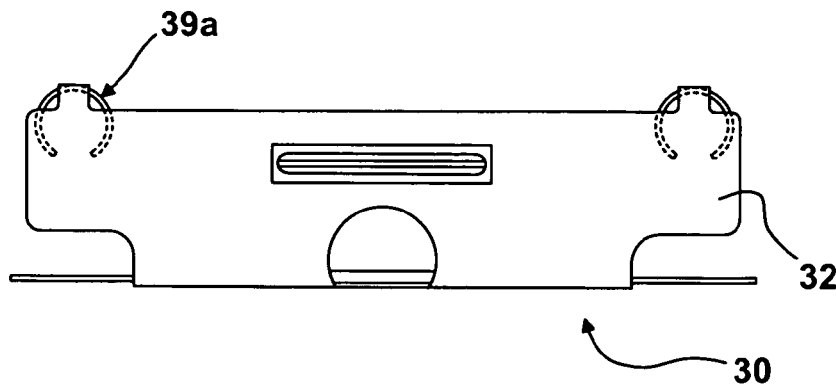
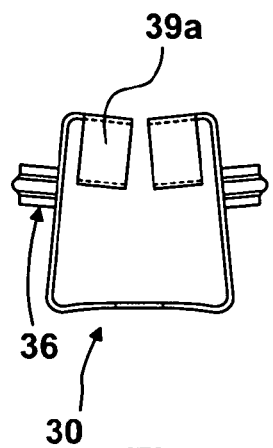
Fig. 7a    Fig. 7b
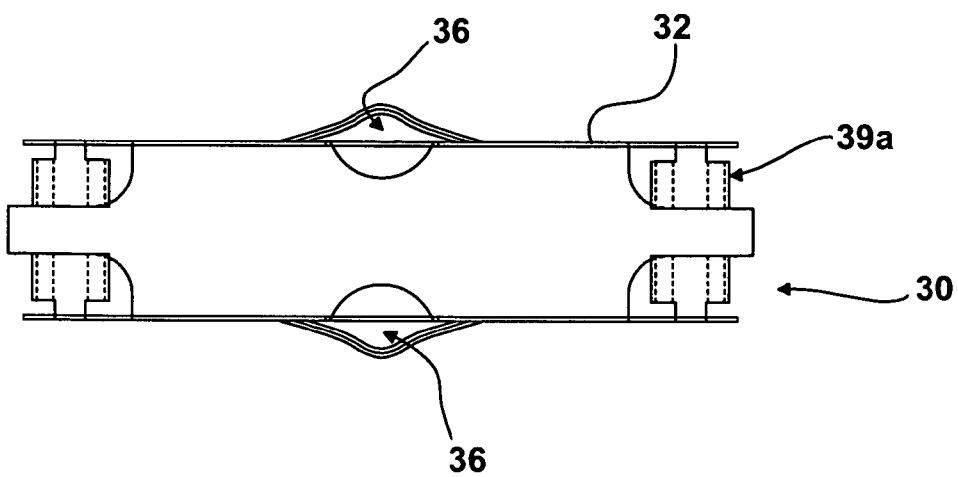
Fig. 7c

BELLOWS OF A CONNECTION BETWEEN TWO HINGE-LINKED VEHICLES

FIELD OF THE INVENTION

The invention relates to a bellows of a connection between two hinge-linked vehicles, said bellows, which comprises a bellows bottom, a bellows roof and bellows side walls, forming a tunnel-like tube, the bellows bottom being a removable constituent part of the bellows, said bellows having a plurality of frames disposed one behind the other in the longitudinal direction of the bellows, the bellows bottom having a plurality of ledges disposed one behind the other.

DESCRIPTION OF THE PRIOR ART

An assembled strut is known from the Utility Model DE 91 13 821.3 U1, two strut parts being adapted to be joined together by a link, shape-mating connecting means being provided for connecting said link with a respective one of the strut parts.

The document DE 43 13 330 C2 shows a clamp for connecting pairwise associated wall elements.

The document DE 1 257 822 B also shows a clamp for fixating two flanges of the frame of a railbound or street vehicle.

The document GB 2 413 833 A describes a sleeve for connecting two bars.

A bellows of the type mentioned herein above is known from EP 0 631 890 B1 for example. The bellows, which is configured to be a pleated bellows in this case, has a plurality of frames that are disposed one behind the other and to which the fabric of the pleated bellows is attached, pleat by pleat, in the region of their ends. The frames serve to stabilize the bellows.

As already explained herein above, the bellows consists of side walls, bottom and roof. To receive the bottom, the bellows has what are termed transition bends in its bottom region, meaning that the bellows side walls are angled approximately 90° inward in the bottom region, said bottom being adapted to be removably received by the bellows in the region of the transition bends. Advantageously, the bottom itself only comprises a cloth that is made from approximately the same material as the bellows roof and the bellows side walls, said cloth having a plurality of loops disposed one behind the other on its underside, said loops being adapted to receive the corresponding ledges, each ledge being connected to a respective one of the frames.

According to prior art, what is termed a connecting profile is provided to connect the ledges and the frames, said connecting profile having a plurality of holes that correspond with holes provided both in a respective one of the ledges and in a respective one of the frames, said connecting profile thus providing for an interlocking connection between frame and ledge by inserting for example rivets or screws through the coinciding openings. The connecting means are assumed to be removable, both with rivets and with screws.

It is also known to connect each ledge to a frame by having the ledge overlapping the frame, both ledge and frame lying inside each other, and two through holes being also provided in the region of the overlap, said through holes also serving to receive screws or rivets in order to provide a removable connection in the same manner as described herein above.

The connection with rivets and screws is complicated, with respect both to assembly and to disassembly. For disassembly, it is more specifically to be taken into consideration that the rivet head must be either sheared or drilled away to release the connection, whilst in case of a screw connection it is to be taken into consideration that the screw is subjected to quite a large amount of dirt, so that it must be assumed that such a screw connection will be impossible to release after some time has elapsed.

Another known possibility of the connection is to push bolts through the through holes provided in the region of overlap between frame and ledge, said bolts having a circumferential, groove-like depression in their end region, a spring steel sheet being pushed over the depression in order to prevent the head bolt from being pulled out.

The spring leaf inserted through the ends of the head bolt into the groove provided for this purpose in the head bolt has the disadvantage that it is quite easy to pull off, especially if it is not well taken hold of by the groove. Furthermore, it has been found out that, during cornering, when the discrete pleats of the bellows and, as a result thereof, the discrete frames rub against each other, this spring leaf is pushed off even if mounted correctly, thus undoing the connection between ledge and frame.

BRIEF SUMMARY OF THE INVENTION

It is therefore the object of the invention to provide a bellows of a connection of the type mentioned herein above in which the bottom is readily connectable to the bellows at low cost and moreover to ensure that the connection between a respective one of the frames and ledges be durably and still readily releasable.

In accordance with the invention, the solution to this object is achieved by the fact that, to connect a respective one of a frame with a ledge, there is provided a spring cramp taking hold of the frame and the ledge, said spring cramp having at least one shoulder for matingly connecting frame and ledge. It is obvious therefrom that such a cramp is pushed from the bottom over the ledge and the frame it is taking hold of, ledge and frame being shape-matingly connected by said cramp. The cramp is advantageously configured to be a spring cramp, the resilient configuration of the cramp ensuring that the cramp maintains the shape-mating connection on its own. A shoulder is provided as a means for shape-matingly taking hold of frames, said shoulder traversing a corresponding hole in frame and ledge, the resilient implementation of the cramp ensuring that this shoulder will remain in the corresponding hole and, as a result thereof, that the shape-mating connection be maintained.

There is more specifically provided that, in order to connect the respective frames and ledges, which are lying inside each other and overlap each other, both the respective frame and the respective ledge have, in the overlap region, at least one through hole for receiving at least one means on the cramp for shape-matingly taking hold of frame and ledge, said means being configured like a shoulder, as already explained. This means that in the region of the overlap between frame and ledge, there is provided at least one through hole in which the shoulder or shoulders is or are kept inserted by the resilient cramp so that the shape-mating connection is maintained. With respect to the arrangement of the means for shape-matingly taking hold of frame and ledge, there is more specifically provided that this cramp, which is advantageously bent to an approximately U-shaped profile, has, in the region of a respective leg, the confronting means for shape-matingly taking hold of frame and ledge.

Both the frame and the ledge are configured to have a section in the shape of a U profile, said frame advantageously receiving the ledge which it overlaps, said ledge fitting against the inside of the frame. The shoulder or shoulders thereby project through the respective legs of frame and ledge.

It has been found particularly practical to have the cramp provided at either ends, on the legs, with shoulders in the form of wings that are directed toward each other, engage through the corresponding through holes in frame and ledge, thus effecting the shape-mating connection between frame and ledge. The wings may hereby be extended portions that are disposed on either end on the legs of the cramp and that are bent at right angles toward each other to be brought into engagement with the corresponding holes, meaning that are a constituent part of the legs of the cramp. Advantageously, arcuate shoulders may be provided rather than wings. For this purpose, a T-shaped shoulder is provided on either side of the legs of the cramp during manufacturing thereof, said shoulder being respectively directed toward the other leg and the crossbar of the T-shaped shoulder being bent to an arcuate shape so that a shoulder in the shape of an arc of a circle is obtained, with the circle not being completely closed, though.

In order for the cramp to be positioned onto the frame, there is provided a pliers-like tool that can be urged apart to take hold of the legs of the cramp. In this context, the legs of the cramp advantageously have two confronting openings for such pliers, more specifically circlip ring pliers.

The invention will be explained in closer detail herein after with reference to the drawings.

BRIEF DESCRIPTION OF THE DRAWINGS

FIG. 7a-7c show three views of another embodiment of a cramp.

DETAILED DESCRIPTION OF THE INVENTION

Figure 1A:
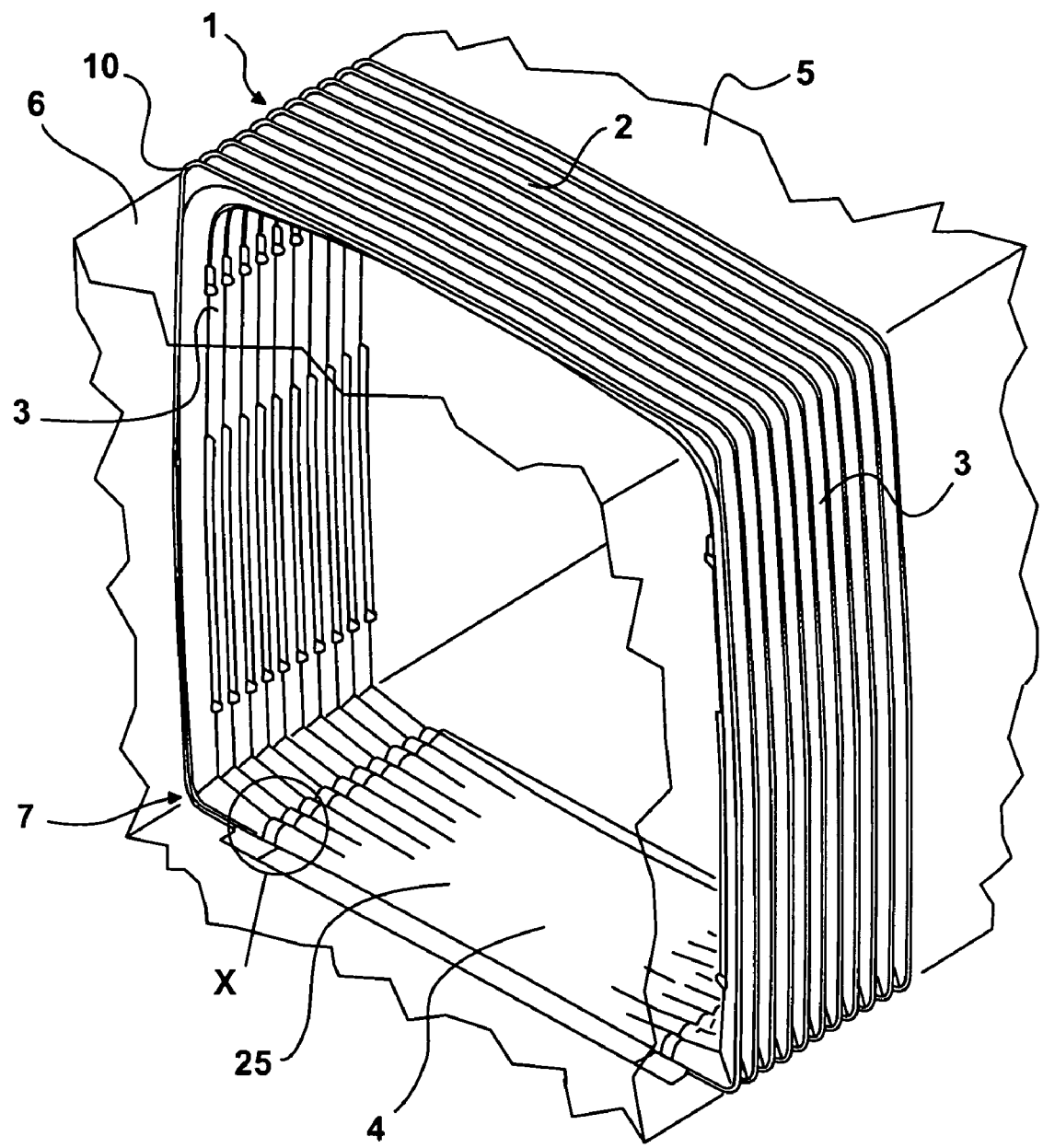
FIG. 1a is a perspective illustration showing a bellows with outlined vehicle parts on either side of the bellows.

In the illustration shown in FIG. 1a, the bellows is labelled at 1, said bellows comprising a bellows roof 2 and bellows side walls 3 as well as the bellows bottom 4. The bellows 1 is the connecting link between the two vehicle parts 5 and 6, which are merely outlined.

In the transition between the bellows side walls 3 and the bellows bottom 4, there are provided what are termed transition bends 7 that constitute almost right-angled bends of the bellows side walls toward the bellows bottom 4. In FIG. 1a there is represented what is termed a pleated bellows. The discrete pleats are edged with frames 10 that are configured to be substantially U-shaped and that clampingly take hold of two cloths converging to form a pleat in the manner known in the art. Accordingly, except for the transition bends, such a frame has an approximately U-shaped profile in cross section.

Figure 1B:
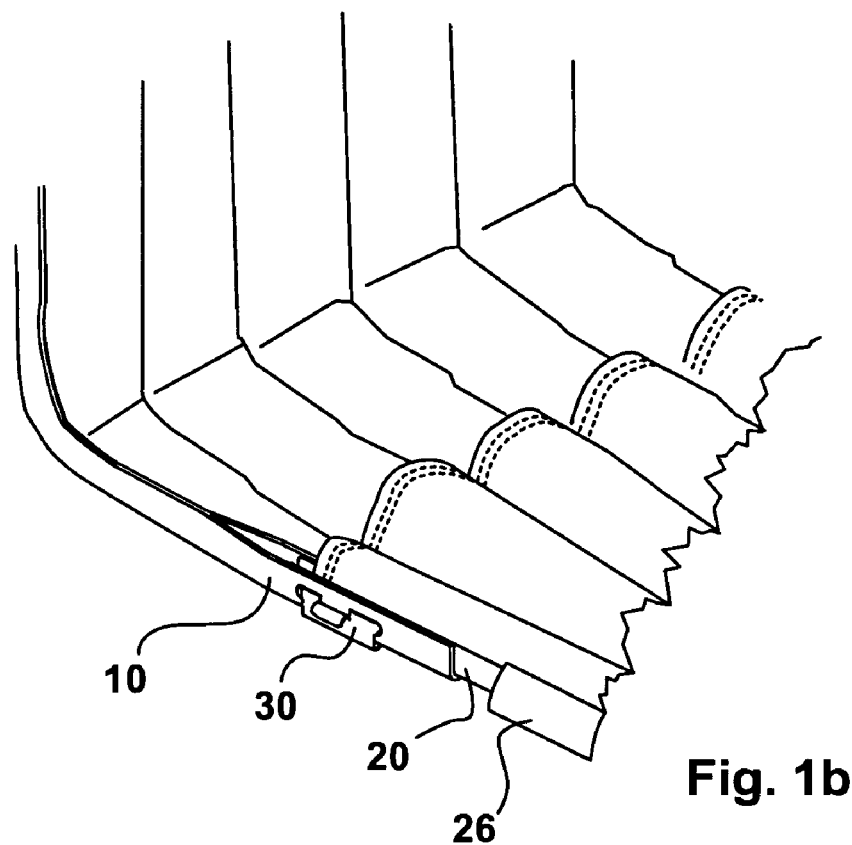
FIG. 1b shows the detail X of FIG. 1a to a much enlarged scale.

In the region of the transition bend 7 in the transition to the bellows bottom 4, the frame has a shoulder 11 that does not take hold of the fabric of a pleat. In the region of this shoulder 11, the ledge 20 of the bottom 4 is carried in the frame 10. The bottom 4 comprises a bottom cloth 25, said bottom cloth 25 having loops 26 on its underside for receiving the ledges 20. There is provided a number of ledges 20 that corresponds to the number of frames 10 since each ledge 20 has to be connected with a respective one of the frames 10 of the bellows. A hook and loop tape 27 is provided between bottom cloth 25 and pleat fabric (FIG. 1b).

Figure 2A:
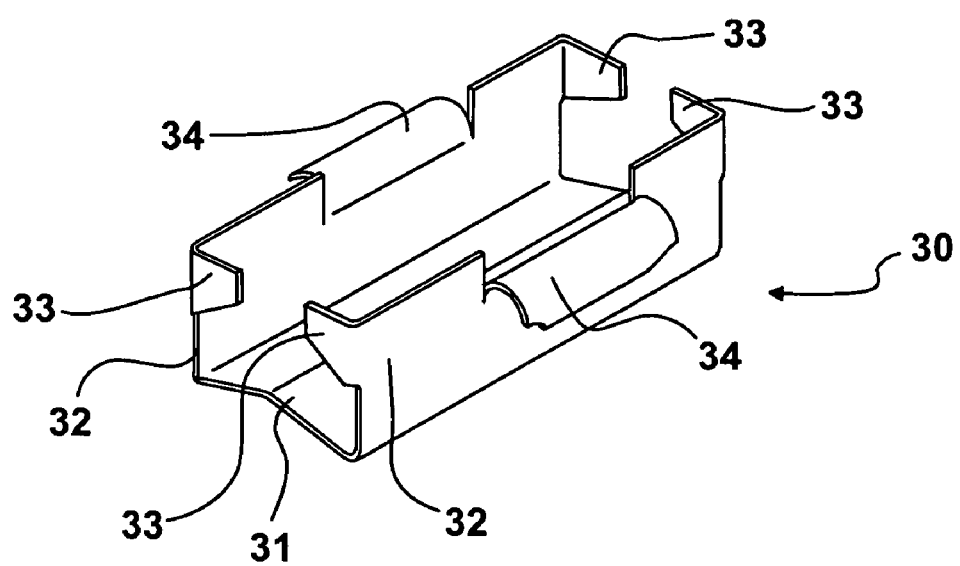
FIG. 2a shows the spring cramp in a first embodiment in a perspective illustration with laterally disposed clips.
Figure 2B:
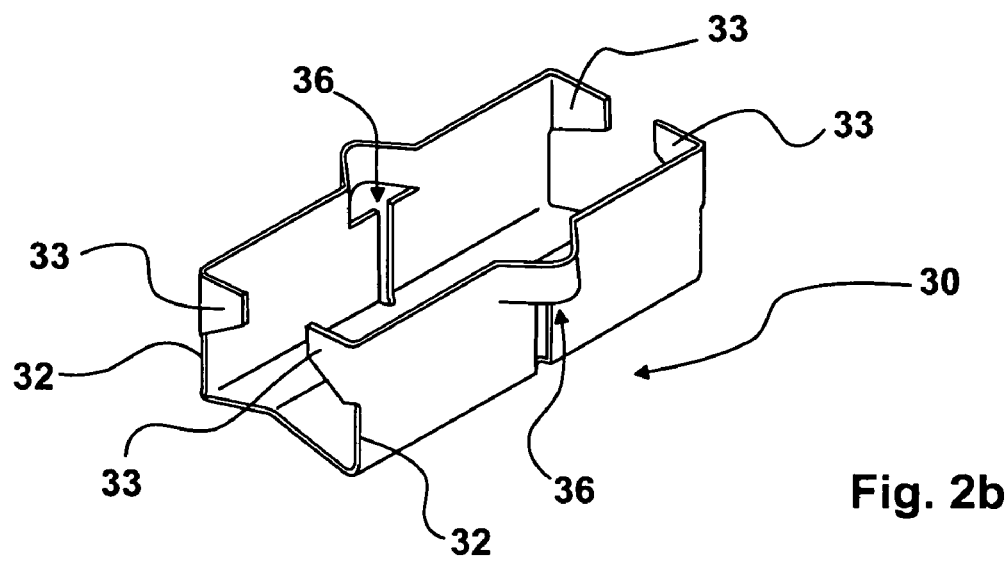
FIG. 2b shows an illustration of a spring cramp as shown in FIG. 2a, the laterally disposed clips having been replaced by openings.
Figure 3:
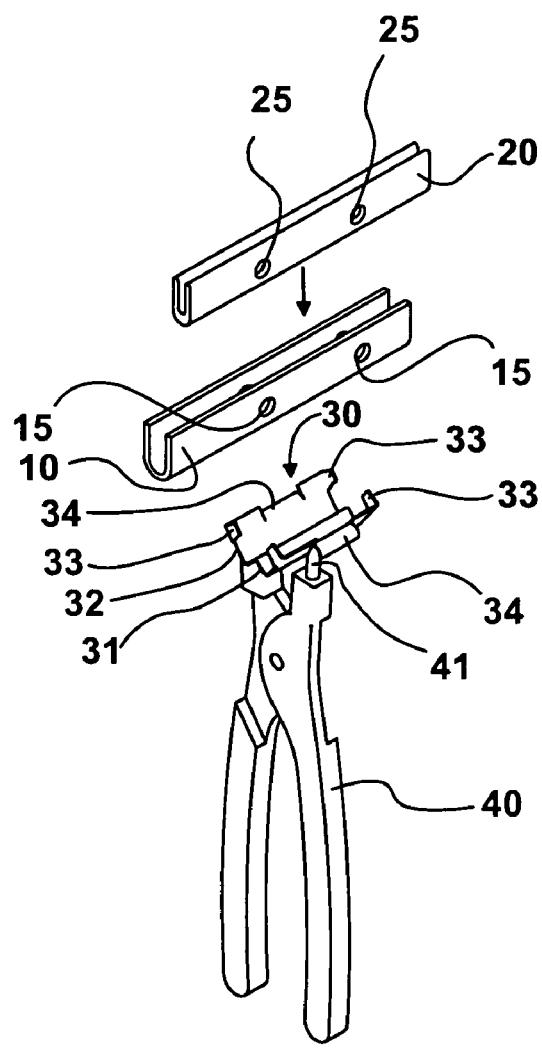
FIG. 3 shows frame and ledge prepared for assembly as well as the spring cramp held by the circlip ring pliers.
Figure 4:
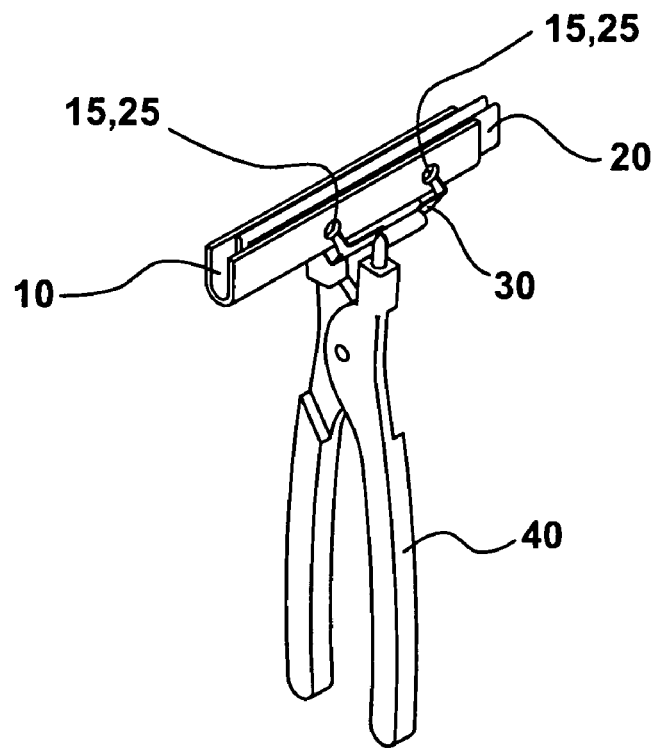
FIG. 4 shows, in a development of FIG. 3, the spring cramp with the wing-like shoulders, shortly before their engagement into the holes in frame and ledge provided for this purpose.
Figure 5:
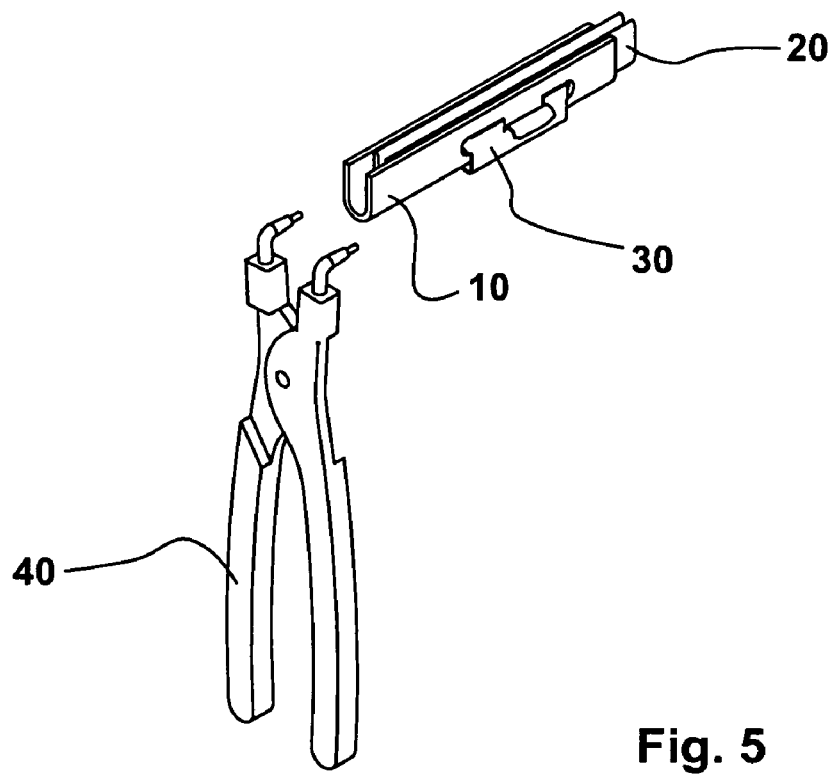
FIG. 5 shows the finished connection.

The type of connection between the frame 10 and the ledge 20 can be seen in closer detail from the illustrations shown in the FIGS. 3 through 5. The connection of the frame 10 with the ledge 20 is performed by the already described spring cramps. Such a spring cramp is shown in a perspective illustration in an embodiment shown in FIG. 2a. The cramp shown therein corresponds to the cramp shown in FIG. 3, said cramp having a clip 34 for positioning the pliers 40 in the region of a respective one of its legs. The U-shaped cramp, which is labelled at 30, has the base 31 and the two legs 32, each leg having at its end a wing-shaped shoulder 33 with the shoulders 33 being directed toward each other. Since the cramp is made from spring steel, the legs 32 can be urged apart, as can be seen in FIG. 3 for example. In order to urge the cramp apart, the cramp has arcuate clips 34 in the region of the legs 32 for the circlip ring pliers 40 to engage therein with its arms 41, as this can also be seen from FIG. 3. The only difference between the cramp illustrated in FIG. 2b and the one shown in FIG. 2a is that, instead of said clip 34, there is provided an opening 36 that can be made by bulging a portion of the leg 32.

The type of connection between the frame 10 and the ledge 20 can be best seen in the FIGS. 3 through 5, as already mentioned herein above; the spring cramp 30 is urged apart first, as shown in FIG. 3, in order to then bring the wing-like shoulders 33 into the region of the openings 15, 25, said shoulders 33 lying in these openings 15, 25 once the spring cramp 30 has snapped together, so that a shape-mating connection between frame 10 and ledge 20 is ensured. The completed connection can be seen in FIG. 5.

Figure 6:
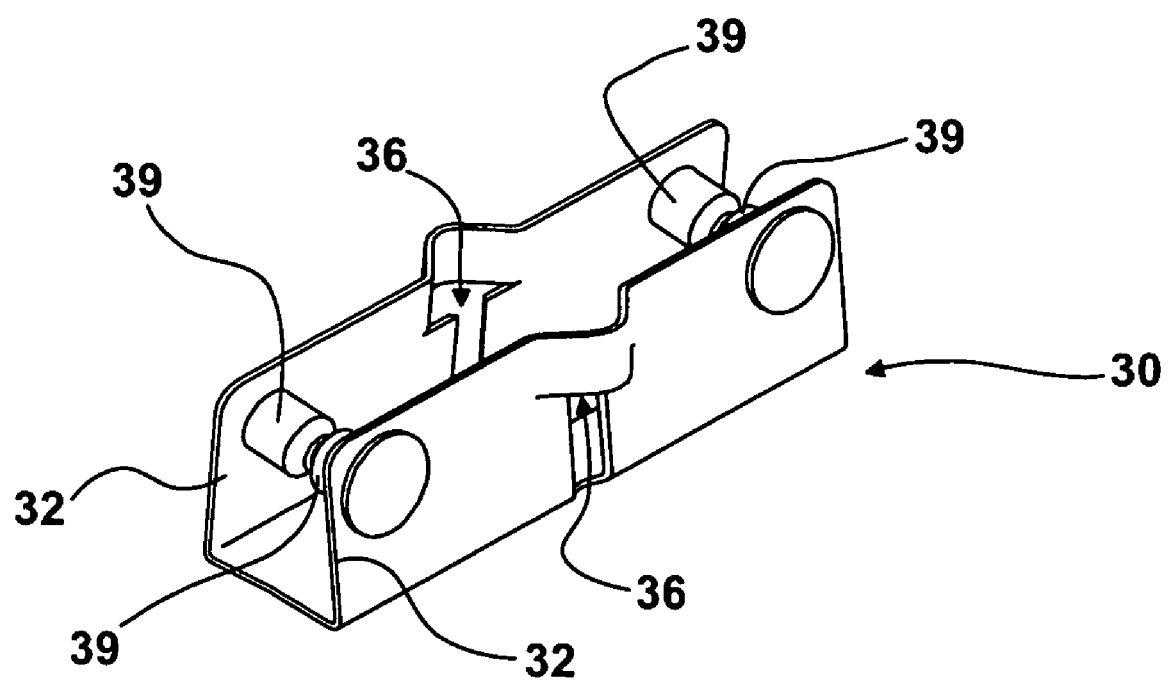
FIG. 6 shows another embodiment of a spring cramp with pin-shaped shoulders.

Another variant of a spring cramp is shown in FIG. 6, the wing-shaped extended portions shown in the FIGS. 2a or 2b being replaced here by pin-like shoulders 39 provided on the legs 32. The seat for receiving the pliers in the embodiment shown in FIG. 6 is the same as in FIG. 2b and accordingly labelled with the same numeral 36.

Another variant of a spring cramp is shown in the FIGS. 7a through 7c, pin-like shoulders 39a disposed respectively at either end of the legs 32 of the cramp being provided there. On either side of the cramp leg there is hereby respectively provided an upward directed T-shaped shoulder that is punched out during the manufacturing of the cramp. The in all four T-shaped shoulders are then bent toward each other and the crossbar of the T-shaped shoulder is bent to an arc of a circle so that pin-like pairs of shoulders 39a are obtained, which are directed toward each other. By the way, the reference numerals here designate the same parts as in the previously described Figs.

I claim:

1. A bellows (1) of a connection between two hinge-linked vehicles (5, 6), said bellows (1), which comprises a bellows bottom (4), a bellows roof (2) and bellows side walls (3), forming a tunnel-shape tube, said bellows bottom (4) being a removable constituent part of said bellows (1), said bellows (1) having a plurality of frames (10) disposed one behind the other in the longitudinal direction of said bellows (1), said bellows bottom (4) having a plurality of ledges (20) disposed one behind the other, wherein connect a respective one of said frames (10) with one of said ledges (20), there is provided a spring cramp (30) taking hold of the frame and the ledge, said spring cramp (30) having at least one shoulder (33) for matingly connecting one of said frames (10) and one of said ledges (20), and that, to connect one of said frames (10) and one of said ledges (20), these are lying inside, each other and overlap each other, both a respective one of the frames (10) and a respective one of the said ledges (20) having, in the region of the overlap, at least one through hole (15, 25) for receiving the at least one shoulder (33) of the cramp (30) for shape-matingly taking hold of one of said frames (10) and the one of said ledges (20).

2. The bellows of a connection between two hinge-linked vehicles as set forth in claim 1, wherein the cramp (30) is bent to an approximately U-shaped profile in cross section, legs (32) being directed toward each other and comprising the shoulder (33) for shape-matingly taking hold of one of said frames (10) and one of said ledges (20).

3. The bellows of a connection between two hinge-linked vehicles as set forth in claim 2, wherein the legs (32) of the cramp (30) are adapted to be urged apart by a pliers-shaped tool (40).

4. The bellows of a connection between two hinge-linked vehicles as set forth in claim 2, wherein the legs (32) of the cramp (30) have two confronting openings (36) or clips for circlip ring pliers (40).

5. The bellows of a connection between two hinge-linked vehicles as set forth in claim 1, wherein the shoulder (33) is configured like a pin.

6. The bellows of a connection between two hinge-linked vehicles as set forth in claim 1, wherein the shoulder (33) is configured in the shape of a wing.

7. The bellows of a connection between two hinge-linked vehicles as set forth claim 1, wherein at either ends of legs (32), the cramp (30) has shoulders (33) directed toward each other and more specifically configured in the form of wings that engage through the corresponding through hole (15, 25) in one of said frames (10) and one of said ledges (20), thus effecting a shape-mating connection between one of said frames (10) and on of said ledges (20).

8. A bellows (1) of a connection between two hinge-linked vehicles (5, 6), said bellows (1), which comprises a bellows bottom (4), a bellows roof (2) and bellows side walls (3), forming a tunnel-like tube, said bellows bottom (4) being a removable constituent part of said bellows (1), said bellows (1) having a plurality of frames (10)disposed one behind the other in the longitudinal direction of said bellows (1), said bellows bottom (4) having a plurality of ledges (20) disposed one behind the other, characterized in that, to connect a respective one of said frames (10) with one of said ledges (20), there is provided a spring cramp (30) taking hold of the frame and the ledge, said spring cramp (30) having at least one shoulder (33) for matingly connecting one of said frames (10) and one of said ledges (20), one of said frames and one of said ledges lying inside each other and overlapping each other to connect the frames (10) and the ledges (20), both a respective one of the frames (10) and a respective one of the ledges (20) having, in the region of the overlap, at least one through hole (15, 25) for receiving the at least one shoulder (33) of the cramp (30)for shape-matingly taking hold of one of said frames (10) and one of said ledges (20).

\* \* \* \* \*